United States Patent [19]

Numata et al.

[11] 4,107,707

[45] Aug. 15, 1978

[54] ANALOGUE OPERATION ADJUSTING MEANS FOR PHOTOGRAPHIC CAMERA

[75] Inventors: Saburo Numata; Shinichiro Okazaki, both of Urawa, Japan

[73] Assignee: Fuji Photo Optical Co., Ltd., Omiya, Japan

[21] Appl. No.: 775,093

[22] Filed: Mar. 7, 1977

[30] Foreign Application Priority Data

Mar. 6, 1976 [JP] Japan .................................. 51-24347

[51] Int. Cl.² .............................................. G03B 7/08
[52] U.S. Cl. .................................... 354/50; 354/60 R
[58] Field of Search ......................... 354/60 R, 50, 51

[56] References Cited

U.S. PATENT DOCUMENTS

| 3,863,263 | 1/1975 | Itagaki .......................... 354/60 R X |
| 4,011,569 | 3/1977 | Mashimo et al. ............... 354/60 R X |

*Primary Examiner*—Michael L. Gellner

[57] ABSTRACT

In a photographic camera provided with an exposure control circuit employing an analogue type arithmetic unit, film speed, aperture size and scene brightness are put into the circuit in the analogue form. In order to compensate for the errors caused by the manufacturing error, a single adjusting element is incorporated into the circuit. The single adjusting element is composed of an additional information input device which is able to input an additional factor into the arithmetic unit independently of the other exposure factors such as the film speed, aperture size and the scene brightness.

8 Claims, 2 Drawing Figures

ANALOGUE OPERATION ADJUSTING MEANS FOR PHOTOGRAPHIC CAMERA

BACKGROUND OF THE INVENTION

1. Field of the Invention

This invention relates to an analogue operation adjusting means, and more particularly to a means for adjusting an analogue arithmetic unit provided in a photographic camera for controlling exposure.

2. Description of the Prior Art

In a photographic camera provided with exposure control circuit, it has been known to use an analogue arithmetic unit in which various kinds of exposure information are handled in the analogue form. In the conventional analogue arithmetic unit in which exposure information such as film speed, aperture size or the like is represented by resistance set by variable resistors, the resistance of the variable resistors are adjusted precisely in advance in the course of manufacture of the camera. In more detail, the terminal voltages of the variable resistors are adjusted to compensate for the errors in the resistances and in the characteristics of various elements including the photodetector of a light measuring circuit.

The above described adjusting means including a number of adjustable factors is disadvantageous in that the operation for adjustment is troublesome in manufacturing the cameras in a mass production process. The camera provided with such adjusting means is disadvantageous in that the structure thereof is complicated due to the number of adjustable elements.

SUMMARY OF THE INVENTION

The primary object of the present invention is to provide an analogue operation adjusting means for a camera with an exposure control circuit in which the errors in the exposure information input means are compensated for by only one adjusting means.

Another object of the present invention is to provide an analogue operation adjusting means for a camera with an exposure control circuit in which the adjustment of the various exposure factor input means is easily and simply conducted by use of a single adjusting means.

The above objects are accomplished by providing an additional adjustable information input means in the analogue arithmetic unit of the exposure control circuit built in a camera. The additional adjustable information input means is simply added to the various exposure information input means in parallel or series therewith. By adjusting the additional adjustable information input means separately from the other exposure information input means, the effective error caused by the various errors in the various input means is compensated.

The gist of the present invention which uses the single adjustable means to compensate for a number of errors is based on the relationship between the various exposure factors represented by the following simple formula of addition.

$$Sv + Fv + Tv = Ev\,(Lv)$$

In the above formula, $Sv$ is film speed, $Fv$ is aperture size, $Tv$ is shutter speed (exposure time), $Ev$ is exposure value and $Lv$ is scene brightness.

Since the exposure value $Ev$ is represented by the above formula, the effective error based on the various exposure factors can be compensated by adding an additional information input means to the arithmetic unit to add an additional analogue value to the sum of the various analogue values obtained by the arithmetic unit.

DESCRIPTION OF THE PREFERRED EMBODIMENT

The principle of the present invention will now be described with reference to FIG. 1. A variable resistor R1 for input of film speed and a variable resistor R2 for input of aperture size are provided to give their intermediate terminal voltages to the input terminal of an operational amplifier OP1 by way of resistors R3 and R4. The operational amplifier OP1 and the resistors R3 and R4 constitute an addition circuit to add the output of the intermediate terminal voltage of the first resistor R1 to that of the second resistor R2. In order to adjust the error in the resistance of these resistors in the conventional circuit, the terminal voltages at both the ends T1 and T2, and T3 and T4 of the resistors R1 and R2 are adjusted. In the present invention, on the other hand, an additional adjustable information is put into the addition input terminal of the operational amplifier OP1 by way of a resistor R5. The additional adjustable information can be adjusted independently of the other exposure information given by the resistors R1 and R2.

Figure 2:
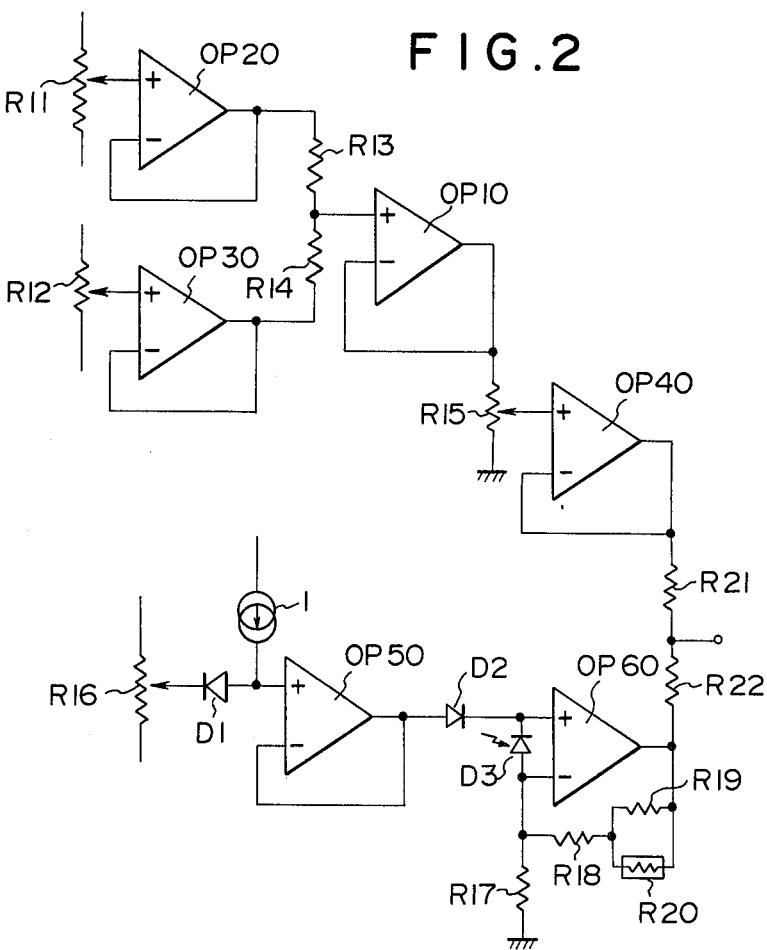
FIG. 2 is a circuit view showing a preferred embodiment of the present invention.

Now a preferred embodiment of the present invention will be described in detail with reference to FIG. 2 which is applied to an automatic exposure control circuit for a photographic camera wherein the shutter speed is controlled in accordance with the scene brightness in view of the film speed and the aperture size. A variable resistor R11 for setting film speed is connected to the addition input terminal of a first operational amplifier OP20 and a second variable resistor R12 for setting aperture size is connected to the addition input terminal of a second operational amplifier OP30. The resistors R11 and R12 are biased with fixed voltages. The operational amplifiers 20 and 30 are buffers which constitute voltage followers to precisely take out the exposure factors $Sv$ and $Fv$, respectively. The outputs of the operational amplifiers OP20 and 30 are put into the non-inversion input terminal of a third operational amplifier OP10 by way of resistors R13 and R14, respectively. The output of the operational amplifier OP10 is grounded by way of a variable resistor R15.

The variable resistor R15 is used for input of the additional adjustable information or factor. The intermediate terminal of the resistor R15 is connected to the addition input terminal of a fourth operational amplifier OP40 constituting a voltage follower. The output of the operational amplifier OP40 is connected to the final output terminal by way of a resistor R21 to which the output of a light measuring circuit is sent by way of a resistor R22. The output of the operational amplifier OP40 and the output of the light measuring circuit are added together to provide the final output for controlling exposure.

A variable resistor R16 is connected to the cathode of a diode D1 to determine the cathode voltage thereof. The diode D1 is biased with a predetermined current from a constant current source 1. The output of the diode D1 is put into the non-inversion input terminal of a fifth operational amplifier OP50 constituting a voltage follower so that the anode voltage of the diode D1 may be taken out therefrom. The output of the fifth operational amplifier OP50 is put into the anode of a diode D2 so that the photocurrent of a photodetector D3 connected to the cathode thereof may be log converted. Thus, the level of measurement by the photodetector D3 is determined by the variable resistor R16. The photodetector D3 is connected between the two input terminals of a sixth operational amplifier OP60. The sixth operational amplifier OP60 is provided with feedback resistors R17, R18, R19 and R20 to change the degree of amplification thereby according to temperature. The resistor 20 is a thermistor which changes its resistance as the temperature changes. Therefore, the operational amplifier OP60 provides a temperature compensated scene brightness information $L_v$.

In the above described circuit, the film speed and the aperture size are put into the operational amplifiers OP20 and OP30 by means of the resistors R11 and R12. The two kinds of exposure factors are put into the third operational amplifier OP10 and added therethrough, and given to the output terminal by way of a variable resistor R15 and the fourth operational amplifier OP40. On the other hand, the scene brightness is measured by the light measuring circuit including the photodetector D3 and given at the output of the sixth operational amplifier OP60. In the film speed and aperture size input means, there are produced errors based on the manufacture errors inherent in the variable resistors R11 and R12. In the scene brightness measuring circuit, there is produced an error based on the manufacture error inherent in the photodetector D3. These errors can be compensated altogether by means of said variable resistor R15 inserted between the final output terminal and the third operational amplifier OP10.

Figure 1:
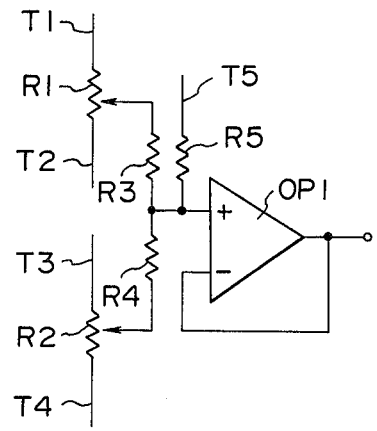
FIG. 1 is a circuit view showing the principle of the present invention.

Although in the above described embodiment there are used buffers to precisely conduct the addition operation, these buffers can be eliminated when so high accuracy is not required, for example, as shown in FIG. 1. Further, the additional adjustable information may be inserted into the circuit at any other proper positions.

We claim:

1. In an analogue type exposure control circuit built in a photographic camera including an analogue arithmetic unit in which a plurality of exposure information input means are connected with the input terminals of the arithmetic unit, an adjusting means for collectively compensating for all of errors due to the plurality of exposure information input means comprising a single additional adjustable information input means connected in parallel with at least one of said exposure information input means, said additional adjustable information input means being adjustable independently of the other exposure information input means.

2. An adjusting means according to claim 1 wherein said arithmetic unit comprises an operational amplifier having a non-inversion input terminal and an inversion input terminal, and said adjusting means is a variable resistor connected with the non-inversion input terminal of said operational amplifier.

3. An adjusting means according to claim 2 wherein said operational amplifier is connected to the output terminal of another arithmetic unit into which the film speed and the aperture size are put.

4. An adjusting means according to claim 2 wherein said variable resistor is manually operable independently of the other exposure information input means.

5. In an analogue type exposure control circuit built in a photographic camera including an analogue arithmetic unit in which a plurality of exposure information input means are connected with the input terminals of the arithmetic unit, an adjusting means for collectively compensating for all of errors due to the plurality of exposure information input means comprising a single additional adjustable information input means connected in series with at least one of said exposure information input means, said additional adjustable information input means being adjustable independently of the other exposure information input means.

6. An adjusting means according to claim 5 wherein said arithmetic unit comprises an operational amplifier having a non-inversion input terminal and an inversion input terminal, and said adjusting means is a variable resistor connected with the non-inversion input terminal of said operational amplifier.

7. An adjusting means according to the output terminal of another arithmetic unit into which the film speed and the aperture size are put.

8. An adjusting means according to claim 6 wherein said variable resistor is manually operable independently of the other exposure information input means.

* * * * *